United States Patent
Daynes et al.

(10) Patent No.: US 7,454,448 B1
(45) Date of Patent: Nov. 18, 2008

(54) SYNCHRONIZING OBJECT PROMOTION IN A MULTI-TASKING VIRTUAL MACHINE WITH GENERATIONAL GARBAGE COLLECTION

(75) Inventors: Laurent P. Daynes, Saint-Ismier (FR); Andrew McClure, West Lafayette, IN (US); Grzegorz J. Czajkowski, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 426 days.

(21) Appl. No.: 11/105,830

(22) Filed: Apr. 14, 2005

(51) Int. Cl.
*G06F 17/30* (2006.01)

(52) U.S. Cl. .................... 707/206; 711/170
(58) Field of Classification Search ............... None
See application file for complete search history.

(56) References Cited

U.S. PATENT DOCUMENTS

| | | | | |
|---|---|---|---|---|
| 5,502,833 A * | 3/1996 | Byrn et al. | ............... | 711/132 |
| 6,510,440 B1 * | 1/2003 | Alpern et al. | ............... | 707/206 |
| 6,826,583 B1 * | 11/2004 | Flood et al. | ............... | 707/206 |
| 6,829,739 B1 * | 12/2004 | Wu | ............... | 714/719 |
| 2002/0133533 A1 * | 9/2002 | Czajkowski et al. | ........ | 709/107 |
| 2006/0161755 A1 * | 7/2006 | Uchikawa et al. | ........... | 711/170 |

* cited by examiner

*Primary Examiner*—Charles Rones
*Assistant Examiner*—Yuk Ting Choi
(74) *Attorney, Agent, or Firm*—Osha • Liang LLP

(57) ABSTRACT

A method for managing memory in a multi-tasking virtual machine, involving suspending a first task for garbage collection of a plurality of concurrently executing tasks, promoting at least one object associated with the first task to a old generation using a gap buffer to obtain a promoted object, wherein the gap buffer stores a gap created by objects directly allocated by at least one of the plurality of concurrently executing tasks, locating the promoted object using the gap buffer, traversing the promoted object to determine whether a first referenced object exist, and promoting the first referenced object using the gap buffer, if the first referenced object exists.

14 Claims, 8 Drawing Sheets

SYNCHRONIZING OBJECT PROMOTION IN A MULTI-TASKING VIRTUAL MACHINE WITH GENERATIONAL GARBAGE COLLECTION

BACKGROUND

A computer system may include a virtual machine that allows execution of hardware independent programs. During program execution, objects may be created that use system memory. Typically, to avoid memory leaks in the computer system, the system memory used by an object is de-allocated after the object is no longer in use.

Conventionally, two methods are used to manage the memory used by objects created during program execution. The first method requires that the executing program monitors the usage of objects, and de-allocates the system memory used by each object when the object is no longer in use. This method requires an application programmer to carefully manage the memory used by each object created in the corresponding program. Further, this method places the responsibility of eliminating memory leaks on the application programmer.

The second method requires the use of an automatic memory management system, or garbage collector. A garbage collector may be a component located within a virtual machine, e.g., a garbage collector built into the Java™ Virtual Machine, or may be a separate entity interfaced with the virtual machine. A typical garbage collector monitors every object created for each task executing on the virtual machine. When the system needs to de-allocate the memory occupied by unused objects, the garbage collector performs garbage collection. Garbage collection is the process of de-allocating the memory of unused (e.g., dead, inactive, etc.) objects, where an unused object may have been created for a single task, or shared among multiple tasks.

A commonly-used garbage collector is a generational garbage collector. A generational garbage collector is based on the observation that most objects die at a young "age," where the age of an object is measured as the time that the object has been alive, beginning with the creation of the object. Specifically, a generational garbage collector manages memory that is separated into two or more generations. Typically, a generational garbage collector manages a young generation and an old generation. During program execution, a newly created object is typically stored in the young generation. However, an object may be directly stored in the old generation for several reasons, including the object is too large for the young generation, the object is known to be long-lived, etc.

When memory is scarce, garbage collection is performed to de-allocate the memory of unused objects. Initially, young generation garbage collection is performed to de-allocate the memory of unused objects in the young generation. Objects that survive the young generation garbage collection (e.g., active objects) may be promoted to the old generation. During promotion of objects to the old generation, if enough memory is not available in the old generation for the objects to be promoted, then full garbage collection is performed. Full garbage collection is performed to de-allocate the memory of unused objects in both the old and young generations.

Further, garbage collection may be performed in a multi-tasking environment (e.g., on a multi-tasking virtual machine), where multiple programs (e.g., application domains, tasks, applications, etc.) execute concurrently and garbage collection is performed on one of the concurrently executing tasks. Further, tasks may be multi-threaded. In this case, an efficient strategy is to share the old generation amongst concurrently executing tasks and to assign to each task a private young generation. The strategy allows young generation garbage collection to be performed on the young objects allocated by one task only.

Garbage collection of the young generation of a task needs a consistent view of the old generation. However, in a multi-tasking environment, the old generation memory area may not remain consistent if concurrently executing tasks directly allocate objects into the old generation. A common solution is to suspend all tasks of the multi-tasking environment (i.e., to stop all threads of all the concurrently executing tasks). In some cases, this may affect the performance and scalability of a multi-tasking virtual machine.

SUMMARY

In general, in one aspect, the invention relates to a method for managing memory in a multi-tasking virtual machine, comprising suspending a first task for garbage collection of a plurality of concurrently executing tasks, promoting at least one object associated with the first task to a old generation using a gap buffer to obtain a promoted object, wherein the gap buffer stores a gap created by objects directly allocated by at least one of the plurality of concurrently executing tasks, locating the promoted object using the gap buffer, traversing the promoted object to determine whether a first referenced object exist, and promoting the first referenced object using the gap buffer, if the first referenced object exists.

In general, in one aspect, the invention relates to a system, comprising a plurality of concurrently executing tasks, wherein each of the plurality of concurrently executing tasks is associated with a private young generation memory, a virtual machine configured to execute the plurality of concurrently executing tasks, and an automatic memory management system (AMMS) operatively connected to the virtual machine and configured to suspend a first task of a plurality of concurrently executing tasks, promote at least one object associated with the first task to an old generation using a gap buffer to obtain a promoted object, wherein the gap buffer stores a gap inserted by objects directly allocated by at least one of the plurality of concurrently executing tasks, locate the promoted object using the gap buffer, traverse the promoted object to determine whether a first referenced object exists, and promote the first referenced object using the gap buffer, if the first referenced object exists.

In general, in one aspect, the invention relates to a computer system for managing memory, comprising a processor, a memory, a storage device, and software instructions stored in the memory for enabling the computer system under control of the processor, to suspend a first task of a plurality of concurrently executing tasks, promote at least one object associated with the first task to an old generation using a gap buffer to obtain a promoted object, wherein the gap buffer stores a gap inserted by objects directly allocated by at least one of the plurality of concurrently executing tasks, locate the promoted object using the gap buffer, traverse the promoted object to determine whether a first referenced object exists, and promote the first referenced object using the gap buffer, if the first referenced object exists.

Other aspects of the invention will be apparent from the following description and the appended claims.

DETAILED DESCRIPTION

Figure 1:
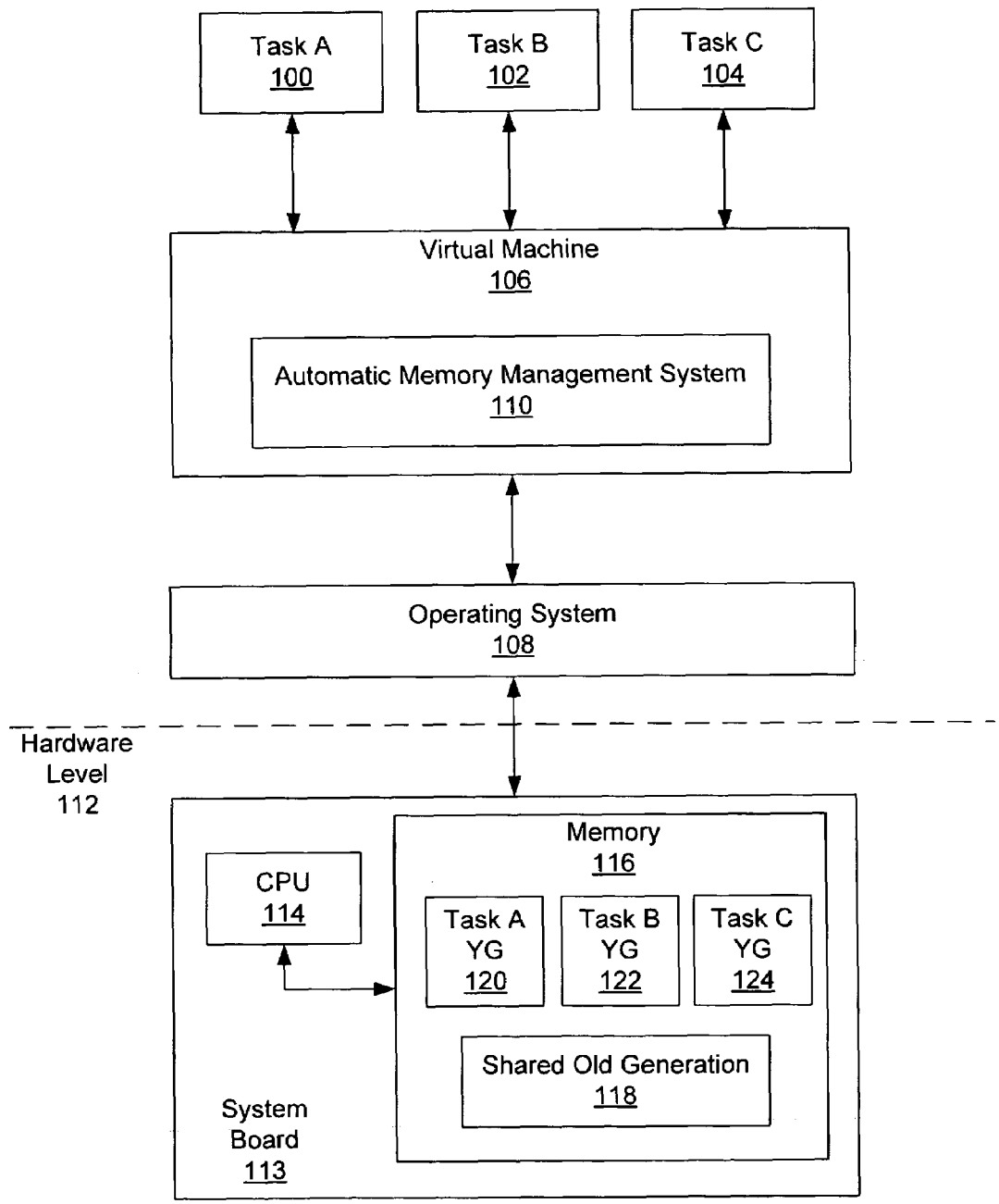
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to synchronizing object promotion in a multi-tasking virtual machine. Specifically, embodiments of the invention relate to promoting objects associated with a particular task from a young generation to an old generation without suspending (e.g., stalling, stopping, etc.) the threads associated with other tasks that may be concurrently executing on the virtual machine. Further, embodiments of the invention use a gap buffer to store gaps in the old generation memory occupied by directly allocated objects.

FIG. 1 shows a system in accordance with one embodiment of the invention. The system may include multiple tasks (i.e., Task A (100), Task B (102), Task C (104)) executing on a virtual machine (106). The virtual machine (106) is operatively connected to an operating system (108), which in turn interfaces with the hardware level (112) of the system allowing the task(s) to execute. In one embodiment of the invention, the virtual machine (106) is a multi-tasking virtual machine that includes functionality to concurrently execute multiple tasks (i.e., any program, process, etc., that creates and uses objects to perform functionalities). In one embodiment of the invention, the virtual machine (106) is a simulated computer/operating environment in that it runs on a host computer but behaves as if it were a separate computer. In one embodiment of the invention, the virtual machine (106) may be an implementation of the Java™ Virtual Machine, a Coherent Virtual Machine, Parallel Virtual Machine, an implementation of the Common Language Runtime (CLR), etc.

Further, the virtual machine (106) may include an automatic memory management system (AMMS) (110). Those skilled in the art will appreciate that while the AMMS (110) is shown as part of the virtual machine (106), the AMMS may also interface with the virtual machine (106) while located outside of the virtual machine (106). In one embodiment of the invention, the AMMS (110) is based on generational garbage collection. As noted above, generational garbage collection manages memory divided into two or more generations, where an object is allocated to a particular generation based on the object's "age."

In one embodiment of the invention, the AMMS (110) divides memory allocated for objects into two generations, i.e., a young generation and an old generation. In one embodiment of the invention, young generation memory space is allocated privately for each task (i.e., Task A (100), Task B (102), Task C (104)) executing on the virtual machine (106), whereas the old generation memory space is shared among all tasks (i.e., Task A (100), Task B (102), Task C (104)). Because memory is allocated for the young generation privately for each task (i.e., Task A (100), Task B (102), Task C (104)), the virtual machine (106) is able to perform young generation garbage collection for one task independently of other executing tasks. Those skilled in the art will further appreciate that the AMMS may divide memory into multiple (i.e., more than two) generations.

In one embodiment of the invention, the AMMS (110) is responsible for collecting unused objects associated with a particular task (i.e., Task A (100), Task B (102), Task C (104)) by performing young generation garbage collection in order to reclaim memory space allocated to the unused objects. In other words, the AMMS (110) performs young generation garbage collection separately for each young generation associated with a particular task (i.e., Task A (100), Task B (102), Task C (104)). In one embodiment of the invention, the AMMS (110) performs young generation garbage collection associated with one task (i.e., Task A (100), Task B (102), Task C (104)) while other tasks (i.e., Task A (100), Task B (102), Task C (104)) are concurrently executing on the virtual machine (106). Further, in one embodiment of the invention, the AMMS (110) includes functionality to promote objects from the young generation associated with a particular task (i.e., Task A (100), Task B (102), Task C (104)) to the old generation (described below).

Continuing with FIG. 1, the operating system (108) interfaces with a system board (113) at the hardware level (112) of the system and is responsible for scheduling instructions passed by the virtual machine (106) on a central processing unit (CPU) (114). Those skilled in the art will appreciate that the system board (113) may include multiple CPUs on which the operating system (108) schedules instructions. In one embodiment of the invention, the system board (113) includes memory (116) used to allocate objects into the young generation of specific tasks (i.e., Task A (100), Task B (102), Task C (104)) and the shared old generation (118). Typically, the memory used by the AMMS (110) is random access memory (RAM). In one embodiment of the invention, each task (i.e., Task A (100), Task B (102), Task C (104)) executing on the virtual machine is associated with a private young generation memory area allocated for the objects in the young generation of that task. For example, Task A (100), Task B (102), and Task C (104) are each associated with a private memory area allocated for objects in the young generation of each task (i.e., Task A YG (120), Task B YG (122), Task C YG (124), respectively). Further, the shared old generation (118) represents a shared area of memory that is used by all tasks (i.e., Task A (100), Task B (102), Task C (104)) to directly allocate or promote objects to the shared old generation.

Figure 2:
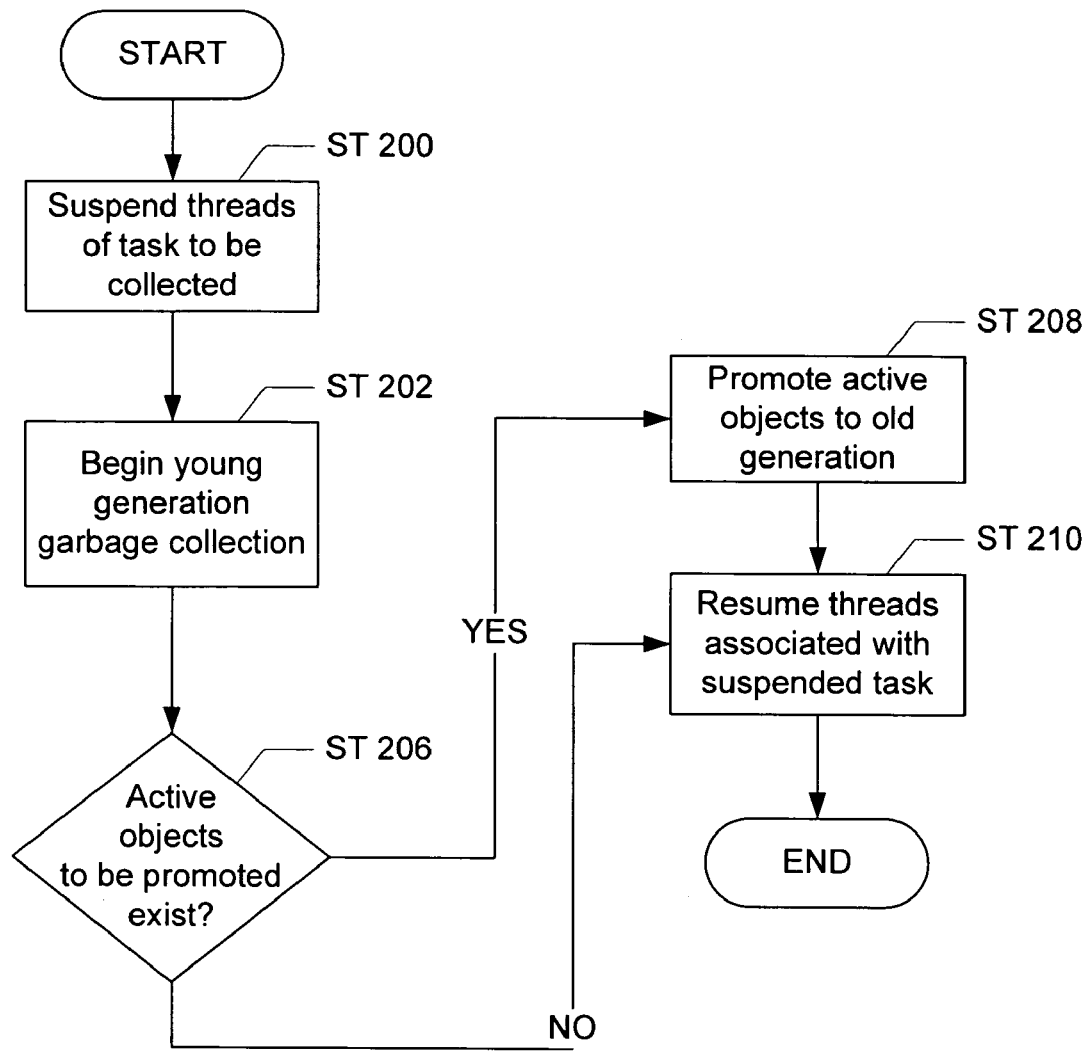
FIG. 2 shows a flow chart in accordance with one embodiment of the invention.

FIG. 2 shows a flow chart for the operation of the AMMS (110 in FIG. 1) in accordance with one embodiment of the invention. As noted above, the AMMS is responsible for automatically managing memory using generational garbage collection. Initially, the threads of the task to be collected (i.e., the threads associated with the task whose objects in the private young generation are collected) are suspended by the AMMS (Step 200). Specifically, only the threads executing on behalf of the task to be collected are suspended, while the threads of other tasks on the multi-tasking virtual machine are concurrently executing.

Subsequently, garbage collection begins on the private young generation memory area associated with the suspended task (Step 202). Specifically, the private young generation memory area is scanned to determine whether any memory is occupied by unused objects. In one embodiment of the invention, the AMMS includes functionality to trace objects from roots of garbage collection. Specifically, in the case of a young generation garbage collection, a root is a memory location outside of the young generation that is actively used by the threads of a task, and that contains a reference to an object of the young generation. An object may be referenced directly or indirectly by a root. For example, if an object is directly referenced by a root, then the root includes a direct pointer to the referenced object. Alternatively, a root may reference a first object, and the first object may reference a second object. In this case, the second object is indirectly referenced by the root. In one embodiment of the invention, if an object cannot be traced from a root, then the object may be inactive (i.e., no longer in use), and the object is subsequently collected (i.e., memory occupied by the inactive object is de-allocated) during generational garbage collection.

Continuing with FIG. 2, a determination is made by the AMMS whether active objects exist in the young generation of the suspended task that need to be promoted to the shared old generation (Step 206). In one embodiment of the invention, if an object survives one or more garbage collections of the suspended task's young generation, then the object may be long-lived, in which case the object may be an active object to be promoted to the shared old generation (Step 208). Those skilled in the art will appreciate that several other methods may be used to determine when an object has lived long enough in a task's young generation to be promoted to the shared old generation. For example, the AMMS may promote objects after some pre-defined time period (i.e., one minute, 100 transactions, etc.) if the object is still alive. In one embodiment of the invention, promotion of an object includes allocation of space for the object in the old generation and copying the object to the allocated space (discussed below). Subsequently, the threads of the suspended task are resumed for execution on the virtual machine (Step 210). Alternatively, if no objects to be promoted to the shared old generation exist, then the threads of the suspended task are resumed (Step 210) and the process ends. Those skilled in the art will appreciate that the process shown in FIG. 2 may be repeated for each privately allocated young generation associated with different tasks executing on the virtual machine.

As noted above, concurrently executing tasks continue running when a particular task is being collected and objects are being promoted from the particular task. Thus, in one embodiment of the invention, concurrently executing tasks may directly allocate objects into the shared old generation while a particular task's objects are being promoted to the shared old generation. In one embodiment of the invention, because allocation from concurrently running tasks may occur during promotion by the AMMS, the allocations for promotion of objects by the AMMS are performed atomically. In one embodiment of the invention, allocations in the old generation are performed by atomically incrementing a free space pointer. Incrementing the free space pointer atomically may be performed using atomic instructions of modern processors (e.g., atomic compare and swap of SPARC processor). As described above, an object may be directly allocated to the shared old generation upon creation if, for example, the object size is too large to fit in the young generation, the object is typically known to be active for a long period of time, the object may be shared across multiple tasks (e.g., an immutable string, etc.), etc. In one embodiment of the invention, to help the AMMS keep track of the objects that are promoted from a particular task and the objects that are directly allocated by a currently running task, the AMMS uses a gap buffer. In one embodiment of the invention, the gap buffer is used to record the bounds of allocated space in the shared old generation that represent directly allocated objects (i.e., the gap buffer records "gaps" in the shared old generation memory that represent directly allocated objects). In one embodiment of the invention, the AMMS keeps track of the address to the upper bound of the last promoted object to detect gaps and update the gap buffer.

Figure 3A:
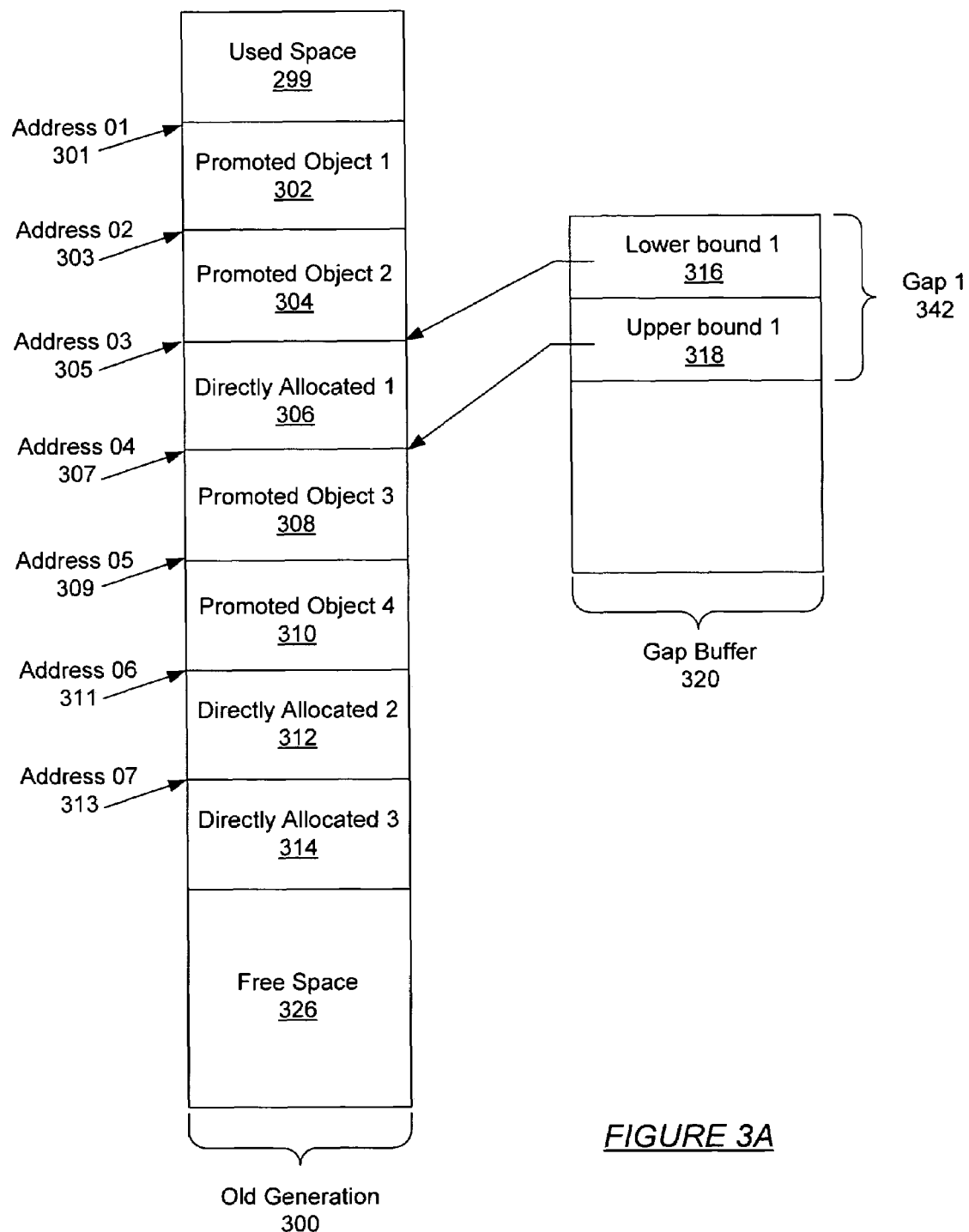
FIG. 3A shows the old generation in accordance with one embodiment of the invention.
Figure 3B:
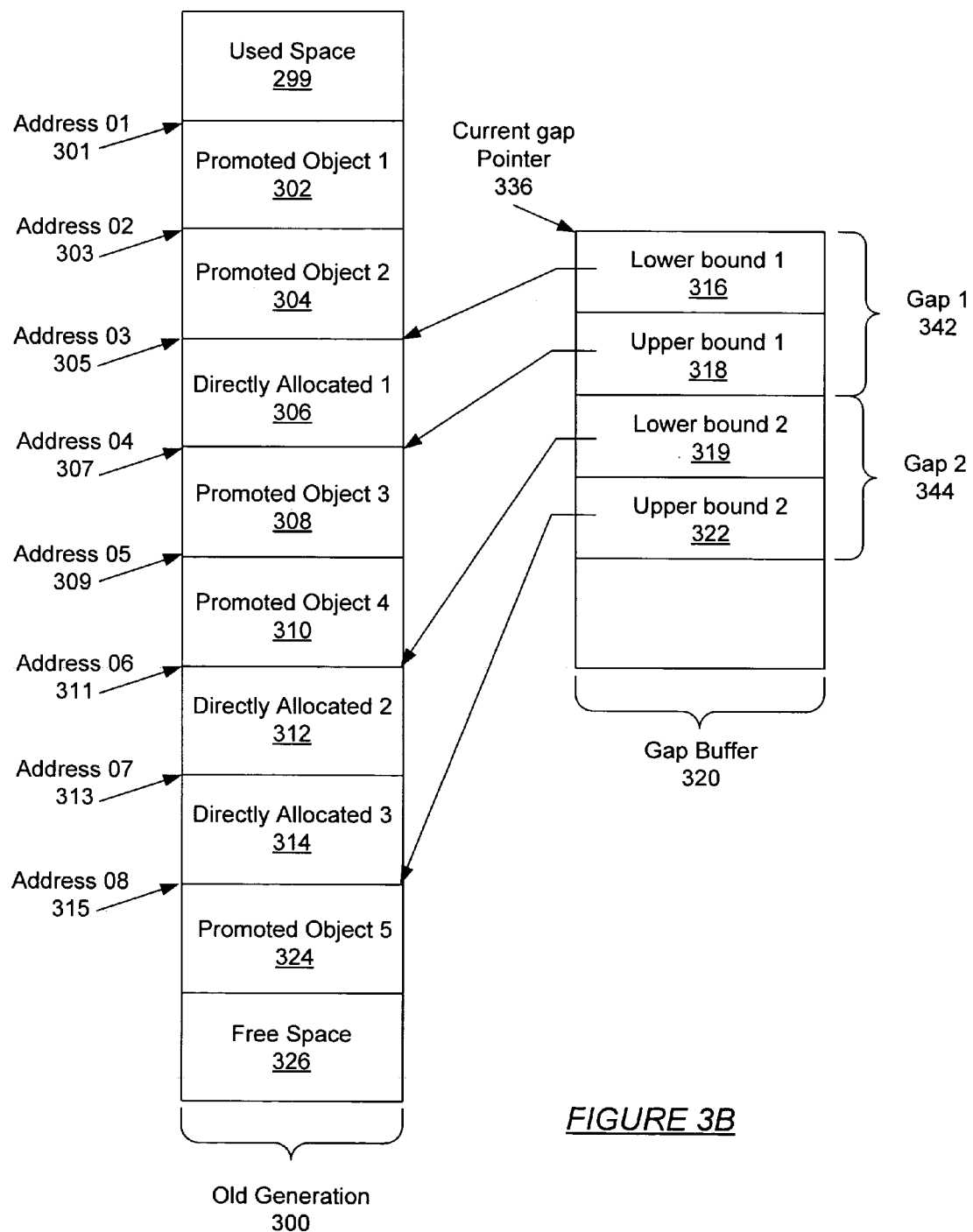
FIG. 3B shows the old generation and a gap buffer in accordance with one embodiment of the invention.

FIGS. 3A and 3B show a gap buffer (320) used to promote objects from a private young generation to the shared old generation in accordance with one embodiment of the invention. Specifically, FIG. 3A shows the old generation (300) split into two sections: used space (299) and free space (326). As objects are promoted and directly allocated, the free space (326) is filled, and the free space pointer, which references the beginning of the free space section (326) of the old generation (300), is updated. For example, Promoted Object 1 (302) has already been promoted by the AMMS and is defined by a lower bound (i.e., Address 01 (301)) and an upper bound (i.e., Address 02 (303)). Similarly, Directly Allocated Object 1 (306) has been allocated by a concurrently executing task. The gap buffer (320) stores "gaps" in the old generation (300) created by directly allocated objects. Each "gap" is defined by a lower and upper bound which corresponds to one or more directly allocated objects. For example, in Gap 1 (342) Lower Bound 1 (316) corresponds to Address 03 (305) and Upper Bound 1 (318) corresponds to Address 04 (307).

In one embodiment of the invention, the AMMS promotes an initial set of objects to the old generation. In one embodiment of the invention, the initial set of objects promoted includes objects that are directly referenced by a root object. In this example, consider the scenario where Promoted Object 1 (302), Promoted Object 2 (304), Promoted Object 3 (308), and Promoted Object 4 (310) are objects that are promoted as part of the initial set. When Promoted Object 1 (302) is promoted to the old generation (300), space for the promoted object is automatically allocated in the old generation (300) according to the size of Promoted Object 1 (302). Further, in one embodiment of the invention, the AMMS updates the address to the upper bound of the last promoted object after each promotion of an object. Thus, for example, after the promotion of Promoted Object 1 (302), the address to the upper bound of the last promoted object stored in the AMMS is Address 02 (303).

In one embodiment of the invention, each time the AMMS promotes an object, the AMMS compares address of the upper bound of the last promoted object to the address of the newly promoted object. If the addresses are equal, then no gap has been created by directly allocated objects between promotions of objects by the AMMS. Alternatively, if the addresses are not equal, then the AMMS records the bounds of the gap between the last promotion of an object and the newly promoted object. Continuing with FIG. 3A, the AMMS promotes Promoted Object 2 (304) into the old generation (300). After the promotion of Promoted Object 2 (304), address of the upper bound of the last promoted object stored in the AMMS is Address 03 (305). Subsequently, Directly Allocated Object 1 (306) is allocated by a concurrently running task. Thus, when the AMMS returns to promote Promoted Object 3 (308), the AMMS allocates space for Promoted Object 3 (308), updates the current free space pointer by the size of Promoted Object 3 (308), and compares address of the upper bound of the last promoted object (i.e., Address 03 (305)) to the address of Promoted Object 3 (308) (i.e., Address 04 (307). Because the addresses are different, the AMMS realizes that a gap was created in the old generation (300) by Directly Allocated Object 1 (306).

In one embodiment of the invention, the AMMS records the lower and upper bounds of the gap (i.e., Gap 1 (342)) in the gap buffer (320). Thus, for this example, Lower Bound 1 (316) corresponding to Address 03 (305), and Upper Bound 1 (318) corresponding to Address 04 (307) are recorded in the gap buffer (320). Subsequently, Promoted Object 4 (310) is promoted to the old generation (300). Because there are no directly allocated objects since the promotion of Promoted Object 3 (308), when the AMMS compares the address of the upper bound of the last promoted object, which is Address 05 (309), to the address of Promoted Object 4 (310) (i.e., also Address 05 (309)), the addresses are equal. Upon the promotion of Promoted Object 4 (310), the address of the upper bound of the last promoted object is updated to reference Address 06 (311) and stored in the AMMS.

FIG. 3B continues the example shown in FIG. 3A and shows the promotion of objects indirectly referenced by a root object. Specifically, FIG. 3B shows the same old generation (300) and gap buffer (320) and adds the promotion of Promoted Object 5 (324), which corresponds to Address 08 (315). Additionally, a second gap (i.e., Gap 2 (344)) is created in the gap buffer (320). In one embodiment of the invention, upon promotion of the initial set of objects, the AMMS returns to the first promoted object (i.e., Promoted Object 1 (302)) to determine whether objects that are referenced by already promoted objects exist. In one embodiment of the invention, if objects referenced by promoted objects (i.e., objects indirectly referenced by a root object) exist, then these objects are also promoted to the shared old generation. For this example, consider the case where Promoted Object 5 (324) is an object referenced by Promoted Object 1 (302).

In one embodiment of the invention, in order to scan promoted objects to determine any referenced objects, the AMMS maintains a current object pointer (not shown) and a gap buffer pointer (336). The current object pointer references the current object to be scanned. The gap buffer pointer (336) references the current gap in the gap buffer (320). Those skilled in the art will appreciate that both the aforementioned reference pointers are updated each time an object is scanned or a gap is skipped over. Specifically, before promotion of the initial set begins, the gap buffer (320) is empty, the value of the upper bound of last promoted object is set to the value of the free space pointer, and the current object pointer is set to the address of the free space pointer. Once promotion of the initial set is completed, the current object pointer is compared to the lower bound of the first gap in the buffer. If they are equal, the current object pointer is set to the upper bound of the first gap in the gap buffer and the gap buffer pointer is updated to point to the next gap in the buffer. In all other cases, the current object pointer remains unchanged.

After scanning of the first promoted object of the initial set, the current object pointer is incremented by the size of the scanned object. If the gap buffer pointer refers to an existing gap, the new value of the current object pointer is compared to the lower bound of the gap referenced by the gap buffer pointer. If the values are equal, the current object pointer is updated to the upper bound of the gap referenced by the gap buffer pointer, and the gap buffer pointer is updated to the next gap. For the example shown in FIG. 3, the current object pointer initially references Address 01 (301), which is the address of the free space pointer when promotion begins. When promotion of the initial set is completed, the gap buffer (320) contains Gap 1 (342). The lower bound (316) of Gap 1 (342) is different from the current object pointer, which references Address 01 (301) and coincides with Promoted Object 1 (302).

Continuing with FIG. 3B, when the AMMS traverses the references of Promoted Object 1 (302) and finds that Promoted Object 5 (which is referenced by Promoted Object 1 (302)) needs to be promoted to the shared old generation, the AMMS allocates space in the old generation based on the size of Promoted Object 5 (324). As shown in FIG. 3B, two objects (i.e., Directly Allocated Object 2 (312) and Directly Allocated Object 3 (314)) have been directly allocated since the last promotion of Promoted Object 4 (310). Thus, when the AMMS compares the address of the upper bound of the last promoted object (330) (i.e., Address 06 (311) in FIG. 3A) to the address of Promoted Object 5 (324) (i.e., Address 08 (315)), the addresses are different. The AMMS then records the lower bound (i.e., Lower Bound 2 (319) corresponding to Address 06 (311)) and upper bound (i.e., Upper Bound 2 (322) corresponding to Address 08 (315)) of Gap 2 (344) created by directly allocated objects into the gap buffer (320).

At this stage, Promoted Object 1 (302) has been scanned and referenced Promoted Object 5 (324) has been promoted to the shared old generation.

Subsequently, the current object pointer is updated to the upper bound of Promoted Object 1 (302) (i.e., Address 02 (303)) and compared to Lower Bound 1 (316) of Gap 1 (342) referenced by the gap buffer pointer (336). Because the address of Promoted Object 2 (304) is not a gap, Promoted Object 2 (304) is scanned in the same manner described above. In this example, let us consider the case where Promoted Object 2 does not reference any other objects. Thus, the AMMS updates the current object pointer to the upper bound of Promoted Object 2 (304) (i.e., Address 03 (305)). This time, when the current object pointer is equal to Lower Bound 1 (316) of Gap 1 (342) pointed to by the gap buffer pointer (336), the addresses are equal. Thus, the current object pointer is updated again to the address referenced by Upper Bound 1 (318) of Gap 1 (342) in the gap buffer (320), to locate the next promoted object. Subsequently, Promoted Object 3 (308) is scanned for any referenced objects that need to be promoted to the shared old generation. Further, in one embodiment of the invention, the gap buffer pointer (336) is updated to reference the lower bound of the next gap (i.e., Lower Bound 2 (320) of Gap 2 (344)) recorded in the gap buffer (320).

Thus, the gap buffer allows the AMMS to record gaps in the old generation (300) when promoting objects and skip over gaps in the old generation (300) when scanning promoted objects to determine any referenced objects. Those skilled in the art will appreciate that the process shown in FIG. 3B is an iterative process that continues until all the objects from the initial set have been scanned for any referenced objects, and all promoted referenced objects have also been scanned for additional referenced objects. In one embodiment of the invention, the AMMS stores a scan upper bound for each scan of the promoted objects. In one embodiment of the invention, the scan of the initial set begins by setting a scan upper bound, which corresponds to the upper bound of the last promoted object. During each scan, the scan upper bound is a constant value. For each subsequent scan of the next set of objects (i.e., the second set of objects referenced from the initial set, the third set of objects referenced from the second set, etc.), the scan upper bound is updated to correspond to the upper bound of the last promoted object. In one embodiment of the invention, objects are iterated over until the current object pointer equals the scan upper bound. After the completion of an iteration, if the scan upper bound is equal to the free space pointer after the last promotion (i.e., no objects have been promoted since the last iteration), then scanning is complete.

Figure 4:
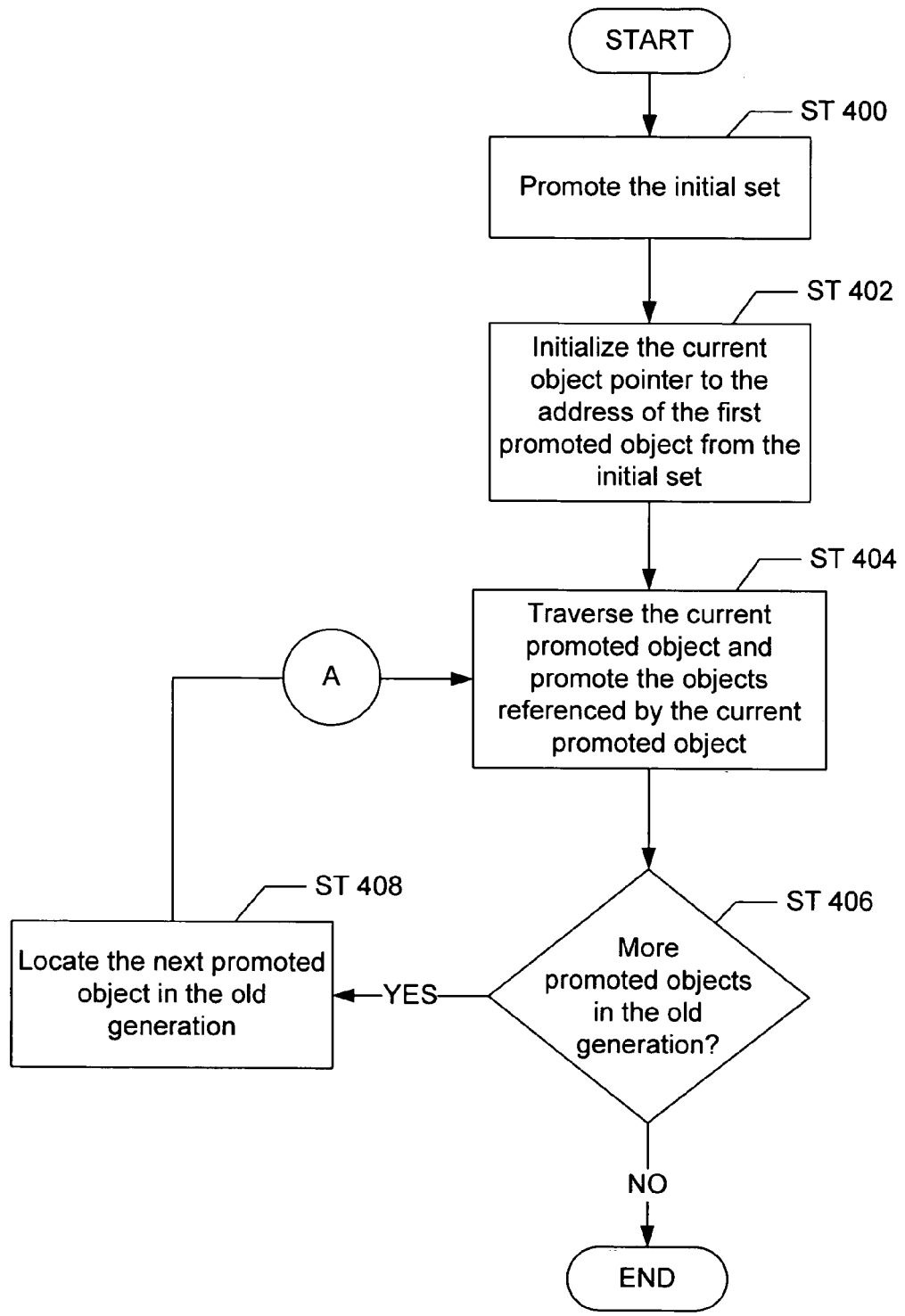
FIGS. 4-6 show flow charts for object promotion in accordance with one embodiment of the invention.
Figure 5:
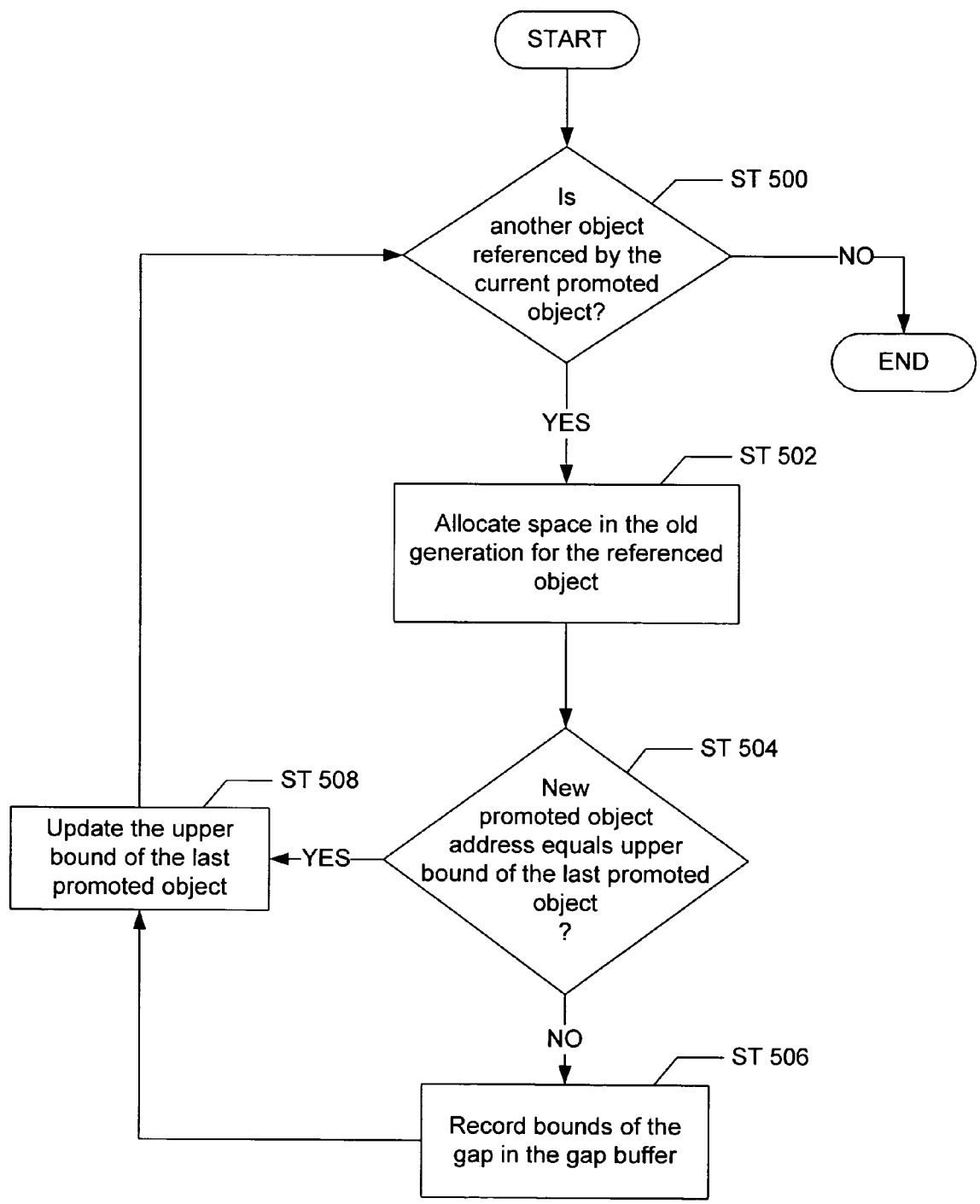
Figure 6:
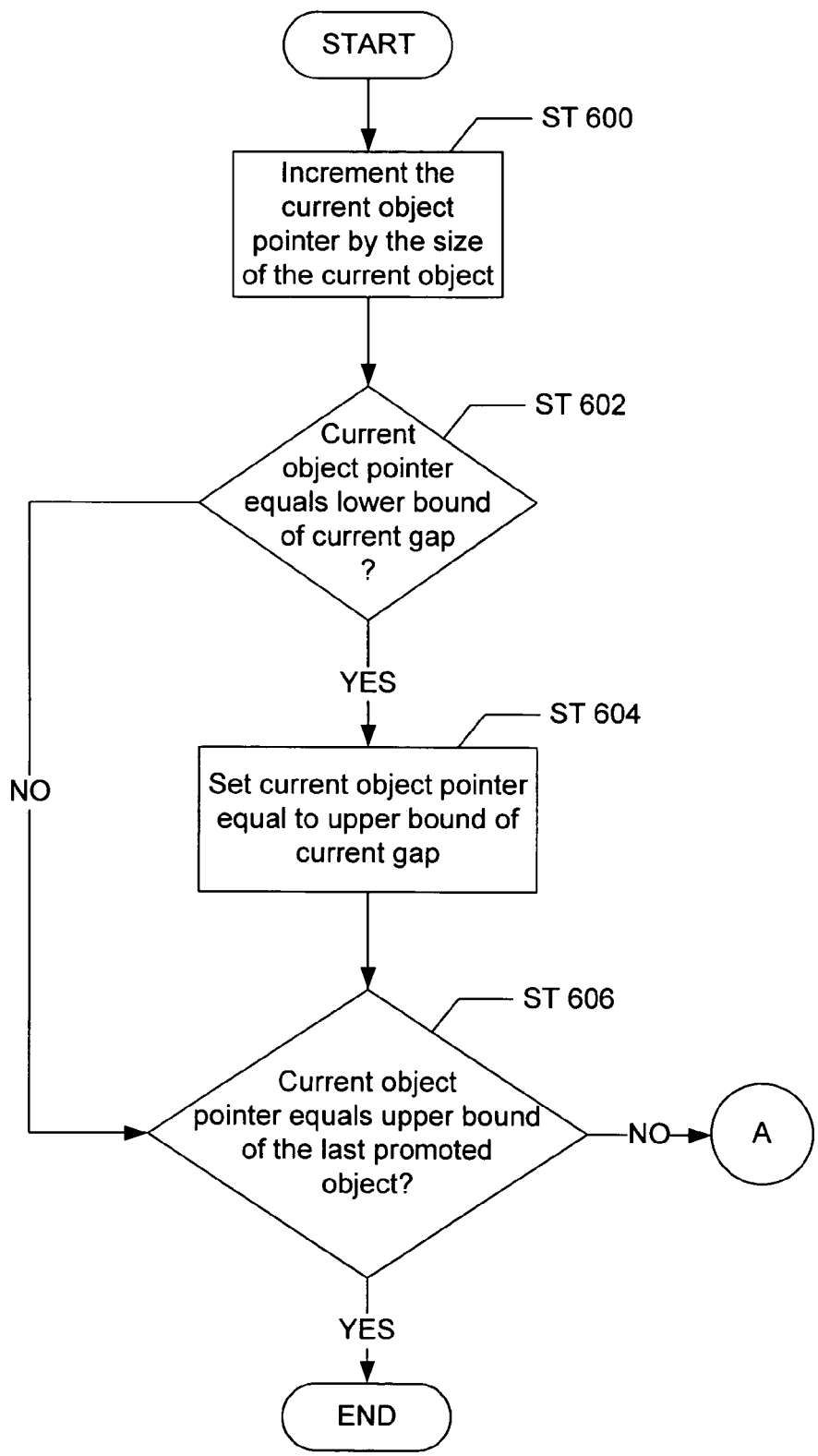

FIGS. 4-6 show flow charts detailing a method of object promotion in accordance with one embodiment of the invention. FIG. 4 describes the steps performed when promoting objects from a private young generation to the shared old generation. Initially, an initial set of objects is promoted from the private young generation as described above in FIGS. 3A and 3B (Step 400). In one embodiment of the invention, the AMMS scans the root objects to promote objects directly referenced by root objects as part of the initial set. As noted above, all the allocation of space for the promotion of objects by the AMMS is performed atomically. Those skilled in the art will appreciate that the promotion of objects in the initial set is performed using the method described above in FIGS. 3A and 3B, where the gap buffer is used to record any gaps inserted by directly allocated objects during promotion of the initial set. Upon completion of promotion of the objects in the initial set using the gap buffer, the objects in the initial set are scanned to promote referenced objects. To begin scanning promoted objects, the current object pointer is initialized to the first promoted object from the initial set (Step 402). Subsequently, the first promoted object is traversed to determine whether the first promoted object references any other objects that need to be promoted to the shared old generation (Step 404).

At this stage, if more promoted objects to be scanned exist (Step 406), then the next promoted object is located (Step 408). In one embodiment of the invention, additional promoted objects exist if the scan upper bound is not equal to the upper bound of the last promoted object. As described above, the next promoted object is located using the gap buffer pointer and the current object pointer. If the lower bound of the gap referenced by the gap buffer pointer is equal to the current object pointer, then a gap exists, and the AMMS skips the gap and locates the next promoted object to scan using the upper bound of the gap referenced by the gap buffer pointer. Subsequently, Steps 404-408 are repeated for each promoted object to be scanned for additional referenced objects. Alternatively, if additional promoted objects do not exist (Step 406), then the process ends.

FIG. 5 shows the flow chart for traversing a promoted object in accordance with one embodiment of the invention. Specifically, FIG. 5 shows the steps required to perform Step 404 of FIG. 4. Initially, a determination is made whether any objects are referenced by the promoted object being scanned (Step 500). If referenced objects do not exist, then the process ends and returns to 406 of FIG. 4. Alternatively, if a referenced object is found, then space is allocated in the old generation for the referenced object to be promoted (i.e., the new promoted object) (Step 502). In one embodiment of the invention, space is allocated by atomically incrementing the free space pointer by the size of the referenced object to be promoted. Subsequently, a determination is made whether the address of the new promoted object equals the upper bound of the last promoted object (Step 504). If the aforementioned two elements are not equal, then a gap exists between the last promoted object and the new promoted object. In this case, a new gap is recorded into the gap buffer (Step 506). The lower bound of the new gap is initialized with the upper bound of the last promoted object. Further, the upper bound of the new gap is initialized with the lower bound of the new promoted object. After the bounds of the gap are recorded, or if the address of the new promoted object and the upper bound of the last promoted are equal, then the upper bound of the last promoted object is set to the upper bound of the new promoted object (Step 508). Subsequently, Steps 500-504 are repeated for each object referenced by the current promoted object being scanned until no additional referenced objects exist.

FIG. 6 shows a flow chart for the steps required to perform Steps 406 and 408 of FIG. 4. If additional promoted objects exist that need to be scanned for referenced objects, then FIG. 4 shows that the next promoted object is located. Thus, FIG. 6 begins by incrementing the current object pointer (i.e., the pointer that references the current object to be scanned) by the size of the current object that has completed being scanned for referenced objects (Step 600). At this stage, a determination is made whether the updated current object pointer equals the lower bound of the current gap (i.e., the gap in the gap buffer referenced by the gap buffer pointer) (Step 602). If the current object pointer equals the lower bound of the current gap, then the memory address pointed to by the current object pointer is a gap, and not a promoted object to be scanned. Thus, the current object pointer is updated to the upper bound of the current gap in the gap buffer (Step 604). Alternatively, if the current object pointer does not equal the lower bound of the current gap, the process moves to Step 606. At Step 606, a determination is made whether the current object pointer equals the upper bound of the last promoted object (Step 606). If the current object pointer equals the upper bound of the last promoted object, then this indicates that additional promoted objects do not exist, and the process ends. Alternatively, if the current object pointer does not equal the upper bound of the last promoted object, then the next promoted object has been located and the process returns to Step 404 of FIG. 4 (denoted by A in FIGS. 4 and 6) (i.e., the next promoted object is traversed to check for any referenced objects that need to be promoted).

Those skilled in the art will appreciate that if free space in the old generation does not exist for the promotion of an object at any time (i.e., during promotion of the initial set or promotion of objects referenced by the initial set), then garbage collection is performed in the shared old generation to de-allocate memory space occupied by unused objects. Further, those skilled in the art will appreciate that the gap buffer itself may be deleted or de-allocated when the promotion of objects from one private young generation completes. Additionally, the processes of the flow charts shown in FIGS. 4-6 may be repeated for garbage collection and promotion of objects from other private young generations associated with other tasks executing on the virtual machine.

Figure 7:
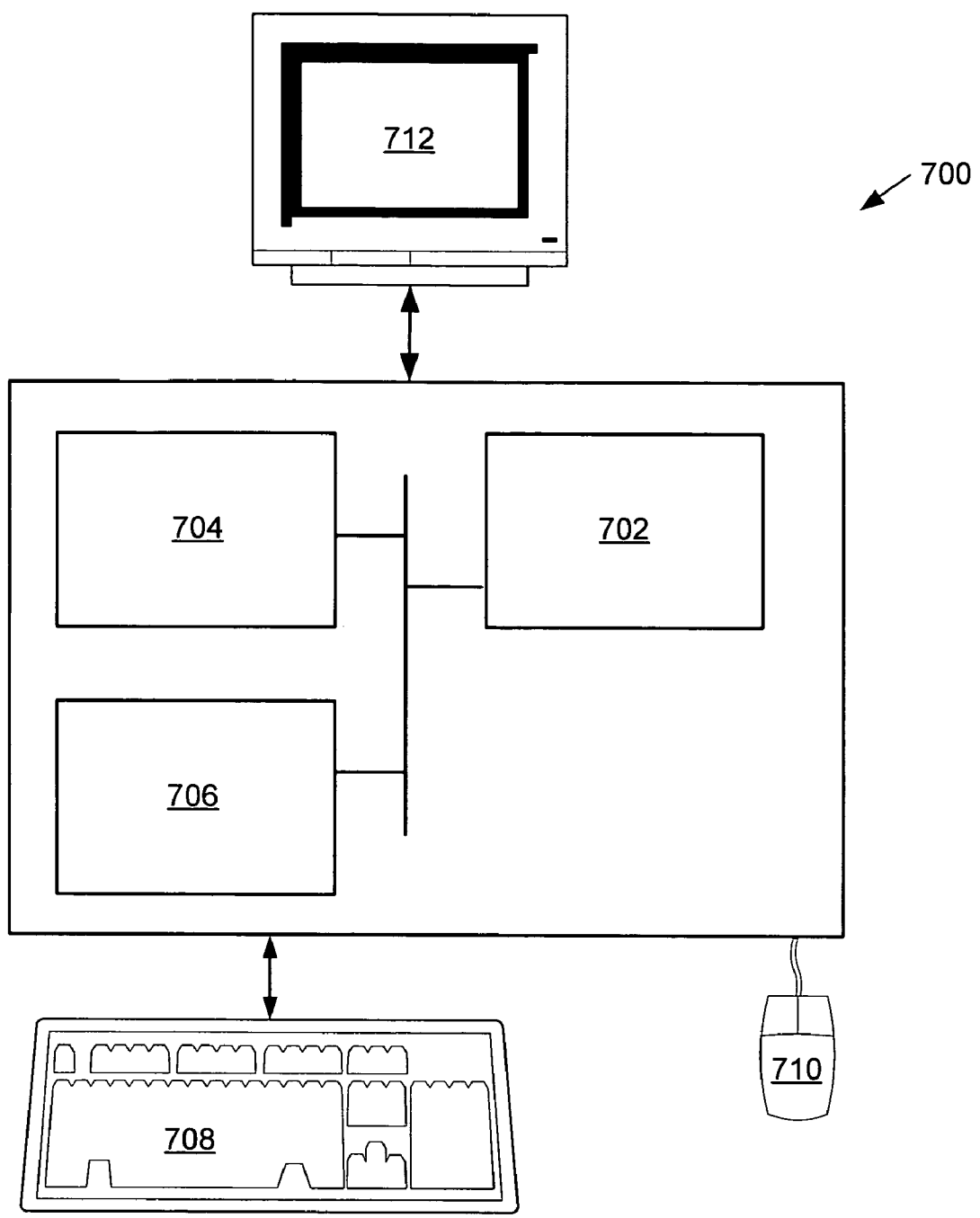
FIG. 7 shows a computer system in accordance with one embodiment of the invention.

An embodiment of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms. Further, those skilled in the art will appreciate that one or more elements of the aforementioned computer (700) may be located at a remote location and connected to the other elements over a network. Further, software instructions to perform embodiments of the invention may be stored on a computer readable medium such as a compact disc (CD), a diskette, a tape, a file, or any other computer readable storage device.

Further, embodiments of the invention may be implemented on a distributed system having a plurality of nodes, where each portion of the invention (e.g., the virtual machine, the plurality of tasks, the operating system, the memory, etc.) may be located on a different node within the distributed system. In one embodiment of the invention, the node corresponds to a computer system. Alternatively, the node may correspond to a processor with associated physical memory.

Embodiments of the invention allow the automatic memory management system to de-allocate memory of unused objects and promote objects from one generation to another generation for one task while other tasks are concurrently executing on a virtual machine. Further, embodiments of the invention allow recording of the bounds of any "gaps" that may occur in the old generation for objects directly allocated by concurrently executing tasks, eliminating the need for the AMMS to constantly have a consistent view of the old generation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing memory in a multi-tasking virtual machine, comprising:
   suspending a first task for garbage collection of a plurality of concurrently executing tasks;
   promoting at least one object associated with the first task to a old generation using a gap buffer to obtain a promoted object, wherein the gap buffer stores a gap created by objects directly allocated by at least one of the plurality of concurrently executing tasks, wherein directly allocated objects are objects that are allocated to the old generation upon creation and without surviving a garbage collection;
   locating the promoted object using the gap buffer;
   traversing the promoted object to determine whether a first referenced object exists; promoting the first referenced object using the gap buffer, if the first referenced object exists;
   initializing the gap buffer, wherein the gap buffer comprises a pointer to a lower bound and a pointer to an upper bound of the gap; and
   initializing a value of a upper bound of a last promoted object, wherein the upper bound of the last promoted object references a memory address associated with the completion of a promotion in the old generation,
   wherein a current object pointer references the promoted object in the old generation,
   wherein a gap buffer pointer references a current gap in the gap buffer, and
   wherein locating the promoted object comprises:
      comparing the current object pointer to a lower bound of the current gap; and
      passing over the current gap created by concurrently executing tasks, wherein the current gap is created when one of the concurrently executing tasks directly allocates an object to the old generation, if the current object pointer is equal to the lower bound of the current gap, wherein passing over the current gap comprises updating the current object pointer to reference an upper bound of the current gap.

2. The method of claim 1, wherein promoting the first referenced object comprises promoting from a private young generation to a shared old generation for the first task while other tasks are concurrently executing.

3. The method of claim 1, further comprising:
   traversing the promoted object to determine whether a second referenced object exists;
   promoting the second referenced object using the gap buffer, if the second referenced object exists.

4. The method of claim 1, further comprising:
   traversing the first referenced object to determine whether a second referenced object exists;
   promoting the second referenced object using the gap buffer, if the second referenced object exists.

5. The method of claim 1, further comprising:
   storing a scan upper bound, wherein the scan upper bound indicates an ending address for an iteration, wherein the iteration comprises scanning the promoted object and traversing the promoted object to promote a set of referenced objects, and wherein the iteration completes when the scan upper bound is reached.

6. The method of claim 1, wherein said promoting at least one object comprises:
   allocating an allocated space in the old generation using a size of the at least one object;
   copying the at least one object to the allocated space;
   determining if a gap was inserted and updating the gap buffer; and
   updating an upper bound of a last promoted object to the upper bound of the allocated space.

7. The method of claim 6, wherein updating the gap buffer comprises:
   comparing the upper bound of the last promoted object to an address of a new promoted object, wherein the new promoted object is the allocated space; and
   if the upper bound of the last promoted object is not equal to the address of the new promoted object:
      recording a lower bound in the gap buffer, wherein the lower bound is the upper bound of the last promoted object; and
      recording an upper bound in the gap buffer, wherein the upper bound is the address of the new promoted object.

8. The method of claim 1, further comprising:
   resuming the first task, wherein the first task is resumed when the current object pointer is equal to the upper bound of the last promoted object.

9. A system, comprising:
   a processor;
   a memory;
   a plurality of concurrently executing tasks executing on the processor, wherein each of the plurality of concurrently executing tasks is associated with a private young generation memory;
   a virtual machine configured to execute the plurality of concurrently executing tasks on the processor; and
   an automatic memory management system (AMMS) operatively connected to the virtual machine and configured to:
      manage the memory;
      suspend a first task of a plurality of concurrently executing tasks;
      promote at least one object associated with the first task to an old generation located in the memory using a gap buffer to obtain a promoted object, wherein the gap buffer stores a gap inserted by objects directly allocated by at least one of the plurality of concurrently executing tasks, and wherein directly allocated objects are objects that are allocated to the old generation upon creation and without surviving a garbage collection;

locate the promoted object using the gap buffer;

traverse the promoted object to determine whether a first referenced object exists;

promote the first referenced object using the gap buffer, if the first referenced object exists;

initialize the gap buffer, wherein the gap buffer comprises a pointer to a lower bound and a pointer to an upper bound of the gap; and initialize a value of an upper bound of a last promoted object, wherein the upper bound of the last promoted object references a memory address associated with the completion of a promotion in the old generation, wherein a current object pointer references the promoted object in the old generation, wherein a gap buffer pointer references a current gap in the gap buffer, and wherein locating the promoted object comprises:

comparing the current object pointer to a lower bound of the current gap; and passing over the current gap created by concurrently executing tasks, wherein the current gap is created when one of the concurrently executing tasks directly allocates an object to the old generation, if the current object pointer is equal to the lower bound of the current gap, wherein passing over the current gap comprises updating the current object pointer to reference an upper bound of the current gap.

10. The system of claim 9, wherein the AMMS is further configured to:

traverse the promoted object to determine whether a second referenced object exists;

promote the second referenced object using the gap buffer, if the second referenced object exists.

11. The system of claim 9, wherein the AMMS is further configured to:

traverse the first referenced object to determine whether a second referenced object exists;

promote the second referenced object using the gap buffer, if the second referenced object exists.

12. The system of claim 9, wherein said promoting at least one object comprises:

allocating an allocated space in the old generation using a size of the at least one object;

copying the at least one object to the allocated space;

determining if a gap was inserted and updating the gap buffer; and updating an upper bound of a last promoted object to an upper bound of the allocated space.

13. The system of claim 12, wherein updating the gap buffer comprises:

comparing the upper bound of the last promoted object to an address of a new promoted object, wherein the new promoted object is the allocated space; and if the upper bound of the last promoted object is not equal to the address of the new promoted object:

recording a lower bound in the gap buffer, wherein the lower bound is the upper bound of the last promoted object; and recording an upper bound in the gap buffer, wherein the upper bound is the address of the new promoted object.

14. The system of claim 9, wherein the AMMS is further configured to:

resume the first task, wherein the first task is resumed when the current object pointer is equal to a free space pointer.

* * * * *